(12) United States Patent
Taverner et al.

(10) Patent No.: US 7,529,434 B2
(45) Date of Patent: May 5, 2009

(54) BRILLOUIN DISTRIBUTED TEMPERATURE SENSING CALIBRATED IN-SITU WITH RAMAN DISTRIBUTED TEMPERATURE SENSING

(75) Inventors: Domino Taverner, Farmington, CT (US); Douglas A. Norton, Houston, TX (US)

(73) Assignee: Weatherford/Lamb, Inc., Houston, TX (US)

(*) Notice: Subject to any disclaimer, the term of this patent is extended or adjusted under 35 U.S.C. 154(b) by 0 days.

(21) Appl. No.: 12/021,537

(22) Filed: Jan. 29, 2008

(65) Prior Publication Data

US 2008/0181554 A1 Jul. 31, 2008

Related U.S. Application Data

(60) Provisional application No. 60/887,558, filed on Jan. 31, 2007.

(51) Int. Cl.
| | |
|---|---|
| G02B 6/00 | (2006.01) |
| G01V 1/40 | (2006.01) |
| G01D 18/00 | (2006.01) |
| G01K 1/00 | (2006.01) |
| G01K 15/00 | (2006.01) |
| G01K 13/12 | (2006.01) |
| G01N 21/00 | (2006.01) |
| G01J 3/00 | (2006.01) |

(52) U.S. Cl. ............... 385/12; 702/6; 702/85; 702/130; 374/1; 374/100; 356/73.1; 356/300

(58) Field of Classification Search .......... 385/12; 702/6, 85, 130; 374/1, 100; 356/73, 300
See application file for complete search history.

(56) References Cited

U.S. PATENT DOCUMENTS

| | | | | |
|---|---|---|---|---|
| 4,986,655 A | * | 1/1991 | Sweeney et al. | 356/73 |
| 6,751,556 B2 | * | 6/2004 | Schroeder et al. | 702/6 |
| 6,807,324 B2 | | 10/2004 | Pruett | |

(Continued)

FOREIGN PATENT DOCUMENTS

GB 2 400 906 10/2004

(Continued)

OTHER PUBLICATIONS

"Simultaneous temperature and strain measurement with combined spontaneous Raman and Brillouin scattering" by Alahbabi et al, Optics Letters, vol. 30, No. 11, Jun. 1, 2005, pp. 1276-1278.*
"Enhanced performance of long range Brillouin intensity based temperature sensors using remote Raman amplification", by Cho et al, Measurement Sicnece and Technology, vol. 15, 2004, pp. 1548-1552.*

(Continued)

*Primary Examiner*—Frank G Font
*Assistant Examiner*—Robert Tavlykaev
(74) *Attorney, Agent, or Firm*—Patterson & Sheridan, LLP

(57) ABSTRACT

Methods and apparatus for distributed temperature sensing (DTS) along a single mode or multimode optical waveguide or fiber include a calibration of initial Brillouin-based DTS measurements using Raman-based DTS measurements to enable accurate subsequent Brillouin-based DTS measurements. Such calibration may occur while the fiber is deployed in the environment in which temperature is to be sensed and thereby corrects influences on Brillouin scattered light from stress or strain along the fiber. Further, calibration may utilize one or more discrete temperature sensors to correct errors in one or both of the Brillouin-based DTS measurements and the Raman-based DTS measurements.

18 Claims, 4 Drawing Sheets

U.S. PATENT DOCUMENTS

2003/0234921 A1* 12/2003 Yamate et al. .............. 356/73.1
2007/0165691 A1    7/2007 Taverner et al.
2007/0223556 A1*  9/2007 Lee et al. ....................... 374/1

FOREIGN PATENT DOCUMENTS

| GB | 2 414 795 | 12/2005 |
| GB | 2 436 142 | 9/2007 |
| JP | 2007240294 | 3/2008 |
| WO | WO 2005/106396 | 11/2005 |
| WO | WO2006/010959 | 2/2006 |

OTHER PUBLICATIONS

GB Search Report, Application No. GB0801658.6, dated Apr. 10, 2008.

* cited by examiner

BRILLOUIN DISTRIBUTED TEMPERATURE SENSING CALIBRATED IN-SITU WITH RAMAN DISTRIBUTED TEMPERATURE SENSING

CROSS-REFERENCE TO RELATED APPLICATIONS

This application claims benefit of U.S. provisional patent application Ser. No. 60/887,558, filed Jan. 31, 2007, which is herein incorporated by reference.

BACKGROUND OF THE INVENTION

1. Field of the Invention

Embodiments of the invention generally relate to distributed temperature sensing.

2. Description of the Related Art

Distributed Temperature Sensing (DTS) enables monitoring temperature along the length of a well bore, for example. A laser or other light source at the surface of the well transmits a pulse of light into a fiber installed along the length of a well to function as a temperature sensor. As the light propagates through the fiber, scattering reflects some of the light back towards the surface for detection. In Raman scattering, incident light is scattered by optical phonons and undergoes relatively large frequency shifts. In Brillouin scattering, incident light is scattered by acoustic phonons and undergoes relatively small frequency shifts. The frequency or intensity of these reflections, relative to the pulsed light, shift in accordance with the temperature of the atoms along the fiber. Accordingly, processing of this reflected light as a function of time can derive temperature as a function of well depth, with earlier reflections indicating the temperature at shallow depths, and later reflections indicating the temperature at relatively deeper depths. Distributed optical waveguide sensors that use Raman or Brillouin scattering may utilize either Optical Time-Domain Reflectometry (OTDR) or Optical Frequency-Domain Reflectometry (OFDR).

Frequency shifts of Brillouin scattered light depends not only on temperature of the fiber but also on strain conditions of the fiber. Therefore, Brillouin-based DTS generally requires assumptions regarding strain conditions that result in uncertainties in temperature measurements especially since strain may not be constant across the length of the fiber. Further, state of strain on the fiber often changes before and after installation, which complicates even making the assumptions required to discriminate strain from temperature influences.

Raman-based DTS systems rely on light intensity measurements of Raman scattered light to provide temperature determinations, which are not dependent on the strain condition of the fiber under normal circumstances. However, the amplitude of the Raman scattered light is much less than that of the Brillouin scattered light resulting in significantly lower optical loss budgets for Raman-based systems. Problems with Raman DTS may occur as a result of the fiber degrading over time and differential loss. For example, hydrogen causes the fiber to darken when absorbed into the fiber that thus attenuates the light due to this darkening. A further problem with deployment of long lengths of the fiber relates to noise since the noise increases with loss, which increases with length. As a result of high loss, differential loss and fiber degradation, the Raman-based DTS may lack sufficient resolution and sustainable accuracy to continue useful and reliable operation over time across long distances.

Therefore, there exists a need for improved systems and methods of distributed temperature sensing.

SUMMARY OF THE INVENTION

A system in one embodiment provides distributed temperature sensing (DTS). The system includes at least one DTS optical fiber. Further, instrumentation coupled to the at least one DTS optical fiber performs Raman-based DTS signal processing, performs Brillouin-based DTS signal processing, and calibrates data from the Brillouin-based DTS signal processing with respect to data from the Raman-based DTS signal processing to provide calibrated temperature measurements.

For a method of one embodiment, DTS includes generating a first temperature profile obtained with Raman-based DTS and generating a second temperature profile obtained with Brillouin-based DTS. The method further includes determining a correction for the second temperature profile based on the first temperature profile. Using the correction calibrates subsequent temperature profiles obtained with the Brillouin-based DTS.

In one embodiment, a system for DTS includes a Raman-based DTS processor and a Brillouin-based DTS processor in combination with a calibration processor that determines a correction for the Brillouin-based DTS processor. The calibration processor includes inputs coupled to the Raman-based DTS processor and the Brillouin-based DTS processor to receive respective data compared to provide the correction. The system further includes an adjusted output of temperature measurements derived from applying the correction to the data from the Brillouin-based DTS processor.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention generally relate to distributed temperature sensing (DTS) along a single mode or multimode optical waveguide or fiber. Systems and methods calibrate initial Brillouin-based DTS measurements using Raman-based DTS measurements to enable accurate subsequent Brillouin-based DTS measurements. Such calibration may occur while the fiber is deployed in an environment in which temperature is to be sensed and thereby corrects influences on Brillouin scattered light from stress or strain along the fiber. Further, calibration may utilize one or more discrete temperature sensors to correct errors in one or both of the Brillouin-based DTS measurements and the Raman-based DTS measurements.

Figure 1:
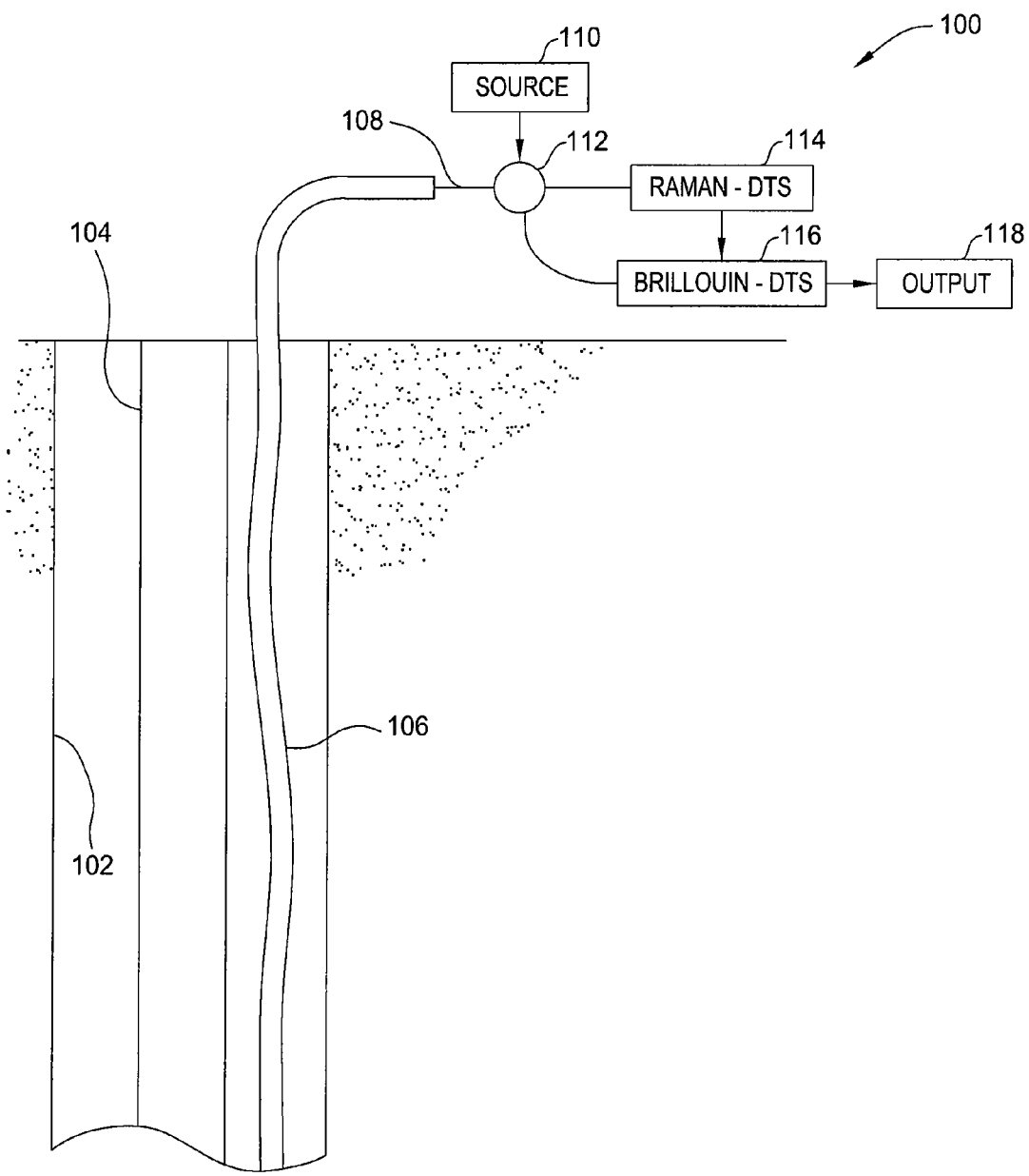
FIG. 1 schematically shows a distributed temperature sensing (DTS) system with a Brillouin-based DTS measurement calibrated using Raman-based DTS, according to one embodiment of the invention.

FIG. 1 shows a DTS system 100 with a Brillouin-based DTS processor 116 calibrated using a Raman-based DTS processor 114. The DTS system 100 includes a light source 110 optically connected by a coupler 112 to at least one optical waveguide, such as an optical fiber 108, within a cable 106 disposed in a cased well 102. The light source 110 in some embodiments includes one or more lasers since both processors 114, 116 may share a common laser and/or waveguide or operate with separate lasers and/or waveguides. The coupler 112 further optically connects receiver/detection equipment of the Brillouin-based DTS processor 116 and the Raman-based DTS processor 114 to the optical fiber 108. In operation, light from the source 110 propagates through the fiber 108 with a portion of the light being scattered back to the processors 114, 116 for analysis as described further herein.

For some embodiments, the cable 106 clamps to an outer circumference of production tubing 104 run into the cased well 102. This exemplary position and routing of the cable 106 represents only one of various applications utilizing the DTS system 100. For example, the cable 106 may be deployed outside casing, along well screen, within walls of the production tubing 104, or in any other settings or industries where such temperature sensing is desired. The cable 106 contains the optical fiber 108, which may be embedded in a gel filled interior of the cable 106 to facilitate protection and isolation of the optical fiber 108 from strain during use.

Location of the cable 106 in the cased well 102 inhibits making assumptions about strain on the fiber 108 or ensuring lack of strain on the fiber 108 since access to the cable 106 is restricted. However, the strain on the fiber 108 can influence readings of the Brillouin-based DTS processor 116 without compensation for influences of the strain when making temperature determinations. Therefore, calibration of the Brillouin-based DTS processor 116 removes any errors caused by the strain on the fiber 108 upon installation or changes in the strain on the fiber 108 that might occur after any earlier calibration. The Raman-based DTS processor 114 relies on light intensity measurements of Raman scattered light to provide temperature determinations that are not influenced by strain like frequency shifts of Brillouin scattered light. The temperature determinations from the Raman-based DTS processor 114 provide a standard or basis to which the readings of the Brillouin-based DTS processor 116 are matched. A temperature offset at each sample point along the fiber 108 to achieve this matching corresponds to a correction. Various approaches exist for determining the correction, such as taking a difference between measurements from the two processors 114, 116 or applying a best fit line or spatial fitting. Applying the correction to subsequent data generated using the Brillouin-based DTS processor 116 thereby calibrates the subsequent data to discriminate temperature from stain and yield accurate temperature measurements.

Once the Brillouin-based DTS processor 116 is calibrated, the Brillouin-based DTS processor 116 may operate to sense temperature independent of the Raman-based DTS processor 114. The Brillouin-based DTS processor 116 can continue to function and sense temperature across the length of the fiber 108 even if losses along the fiber 108 encountered after the calibration prevent analysis with the Raman-based DTS processor 114. In some embodiments, one or more additional calibrations of the Brillouin-based DTS processor 116 using the Raman-based DTS processor 114 occur after an initial calibration once the cable 106 is in place along where sensing is desired. For example, the Raman-based DTS processor 114 may enable calibrating a rate of response of the Brillouin-based DTS processor 116 relative to changes in temperature. While the Brillouin-based DTS processor 116 may use an approximate calibration for the rate of response per change in temperature as determined prior to installation in an oven environment without strain, taking another calibration as set forth herein between differing temperatures and while in use improves reliability in the temperature measurements obtained with the Brillouin-based DTS processor 116.

In some embodiments, the DTS system 100 further includes an output 118 of the temperature measurements obtained with the Brillouin-based DTS processor 116 and corrected to remove influences from strain by the calibration against the Raman-based DTS processor 114. The output 118 may communicate the temperature measurements to a user via a video screen or a printout, generate a signal based on the temperature measurements, or control a device based on the temperature measurements. The output 118 conveys the temperature measurements as either a full temperature profile along the length of the fiber 108 or temperature values at any number of locations within the profile.

Figure 2:
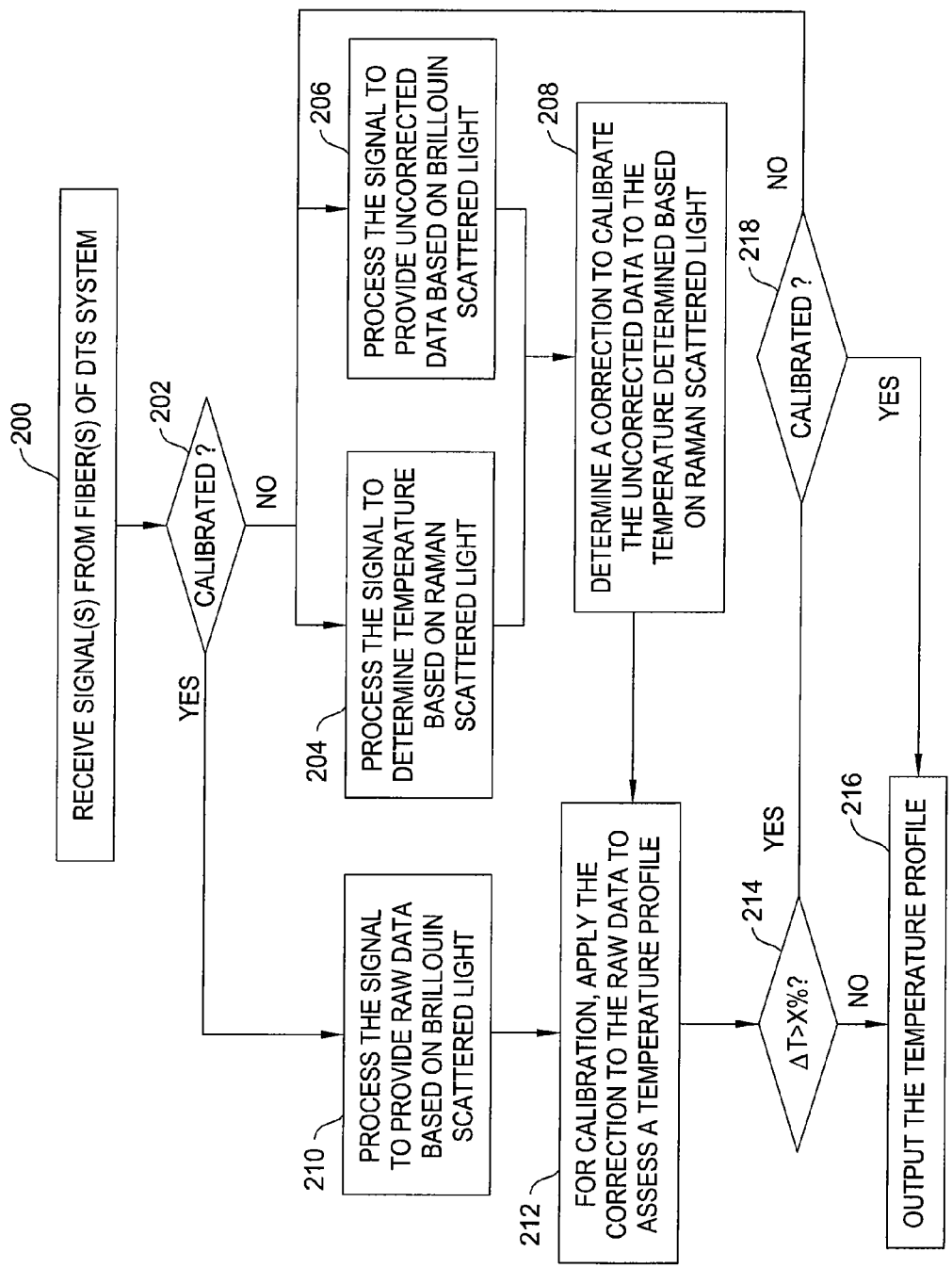
FIG. 2 depicts a method of measuring temperature sensed with the DTS system shown in FIG. 1, according to one embodiment of the invention.

FIG. 2 depicts a DTS method of measuring temperature sensed with, for example, the DTS system 100. A detection step 200 starts by receiving signals of back scattered light from one or more fibers of the system throughout time intervals in which temperature data is desired. A first decision step 202 determines whether Brillouin-based DTS instrumentation has been calibrated in-situ. If not, the signals are processed in both a basis step 204 to determine temperature based on Raman scattered light and an unadjusted step 206 to provide uncorrected data based on Brillouin scattered light. In an evaluation step 208, the basis and unadjusted steps 204, 206 then enable comparing at one time and at like locations the uncorrected data with the temperature determined based on Raman scattered light in order to determine a correction that calibrates the uncorrected data. After the correction is determined, the first decision step 202 proceeds with processing of any of the signals received for the time intervals that temperature data is desired to provide raw data based on Brillouin scattered light in an acquisition step 210 prior to calibration of the raw data by applying the correction to the raw data in an adjustment step 212. A temperature profile thereby assessed in the adjustment step 212 outputs via a final transmission step 216.

For some embodiments, an optional second decision step 214 may determine whether a difference between a temperature (either one location or an average of the profile) currently assessed in the adjustment step 212 and a previous assessment is greater than a certain criteria (e.g., 10% of the temperature currently assessed). While the temperature profile outputs in the final transmission step 216 if temperature change is below the criteria, a yes answer to the second decision step 214 leads to a third decision step 218. The third decision step 218 determines whether Brillouin-based DTS instrumentation has been calibrated for a rate of response per change in temperature. If not, the basis and unadjusted steps 204, 206 followed by the evaluation step 208 are repeated for current conditions to update the correction, thereby accounting for the rate of response per change in temperature. Otherwise, the temperature profile outputs in the final transmission step 216 without requiring further calibration.

Figure 3:
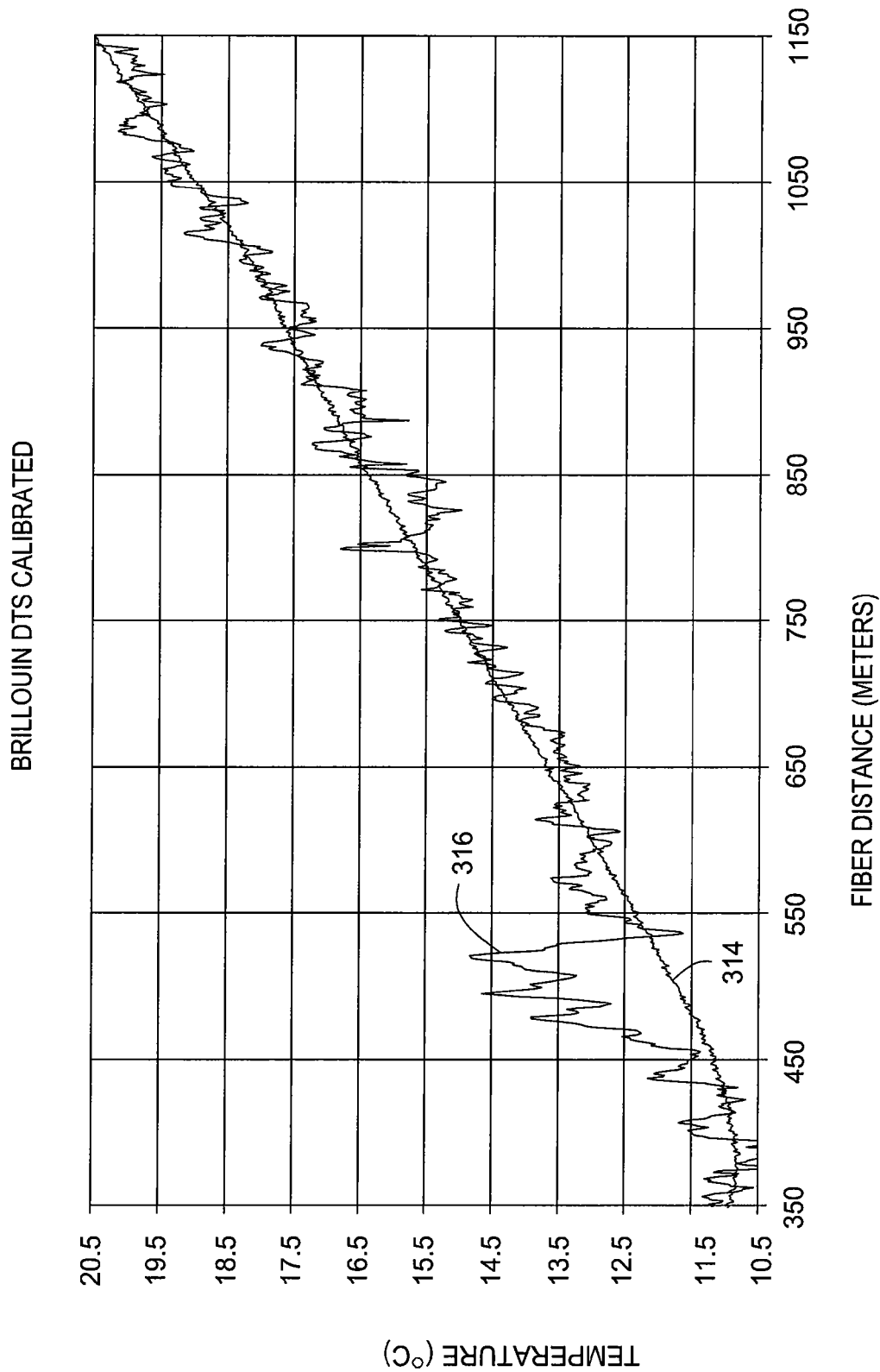
FIG. 3 illustrates a temperature versus distance plot showing correction required to normalize raw data based on Brillouin scattered light.

FIG. 3 illustrates a temperature versus distance plot showing correction required to normalize raw data 316 based on Brillouin scattered light. A basis/corrected curve 314 corresponds to measurements made based on Raman scattered light. Once the calibration is applied to the raw data 316, corrected measurements based on Brillouin scattered light match the basis/corrected curve 314. For example, correction of the raw data 316 at 850 meters requires about +0.75° C. while almost no correction is needed at 950 meters. The correction at each location along the fiber differs and can be applied to any subsequent processing based on Brillouin scattered light.

Figure 4:
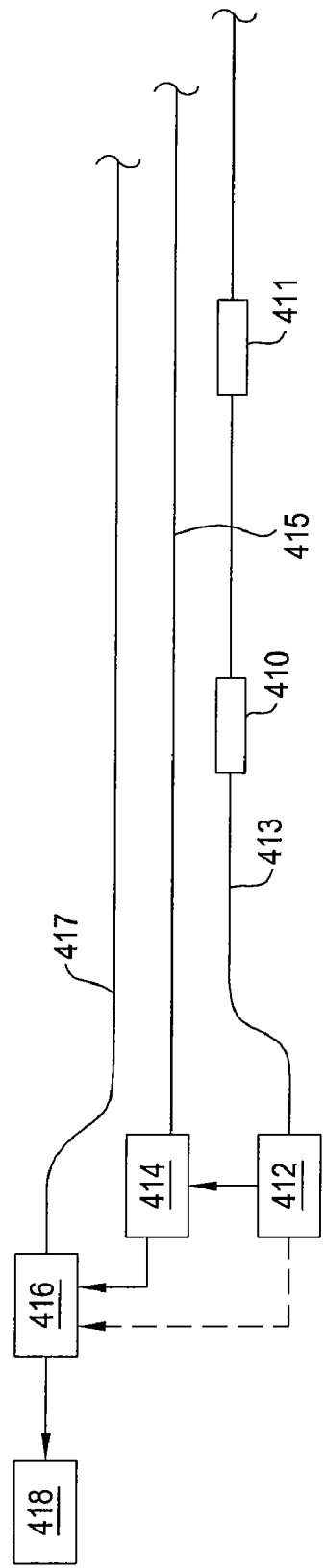
FIG. 4 represents a schematic for another DTS system with a Brillouin-based DTS measurement calibrated using Raman-based DTS in combination with discrete temperature sensors, according to one embodiment of the invention.

FIG. 4 represents a schematic for another DTS system with Brillouin-based DTS instrumentation 416 calibrated using Raman-based DTS instrumentation 414 prior to transmitting results to an output 418. The Brillouin-based DTS instrumentation 416 includes for some embodiments circuitry to analyze Brillouin scattered light from a single mode first fiber 417 utilizing Optical Time-Domain Reflectometry (OTDR). A single mode second fiber 415 separate from the first fiber 417 couples to the Raman-based DTS instrumentation 414 that includes in some embodiments circuitry to analyze Raman scattered light from the second fiber 415 also utilizing OTDR.

Each of the Raman-based DTS and Brillouin-based DTS instrumentation 414, 416 may include individual light transmission devices or sources for introducing light into respective ones of the fibers 415, 417. If the Raman-based DTS and Brillouin-based DTS instrumentation 414, 416 operate at different wavelengths, aligning distances along the fibers 415, 417 in order to make the calibration of the Brillouin-based DTS instrumentation 416 may take account of the different wavelengths with respect to responses received at the Raman-based DTS and Brillouin-based DTS instrumentation 414, 416. Further, starting all analysis at a common point, such as identifiable by a common connector, aides in the aligning of the distances along the fibers 415, 417 when making the calibration of the Brillouin-based DTS instrumentation 416 against the Raman-based DTS instrumentation 414.

For some embodiments, point temperature instrumentation 412 measures temperatures at one or more discrete locations corresponding to locations along the first and second fibers 417, 415. Temperature sensors 410, 411 couple to the point temperature instrumentation 412 through a control line 413. The fibers 415, 417 and the control line 413 may all form a cable, such as shown in FIG. 1, and hence be bound together. The sensors 410, 411 may include Bragg grating devices that optically sense temperature using a waveguide of the control line 413 for transmitting light to and from the sensors 410, 411. Thermistors or other electronic devices may form the temperature sensors 410, 411 in some embodiments. The point temperature instrumentation 412 provides feedback to one or both of the Raman-based DTS and Brillouin-based DTS instrumentation 414, 416 for further calibration. For example, adjustment of a temperature profile of the Raman-based DTS instrumentation 414 may occur, prior to calibration of the Brillouin-based DTS instrumentation 416, by comparison of temperatures from the point temperature instrumentation 412 with temperatures assessed by the Raman-based DTS instrumentation 414 at respective distances where the temperature sensors 410, 411 are located. If the Brillouin-based DTS instrumentation 416 is calibrated first with feedback from the Raman-based DTS instrumentation 414, further adjustment of a temperature profile of the Brillouin-based DTS instrumentation 416, that is already calibrated to discriminate strain influences, may then occur by comparison of temperatures from the point temperature instrumentation 412 with temperatures assessed by the Brillouin-based DTS instrumentation 416 at respective distances where the temperature sensors 410, 411 are located. Some embodiments, calibrate the Brillouin-based DTS instrumentation 416 with only the point temperature instrumentation 412.

Timing, techniques and equipment for performing the calibration described herein may vary and may utilize components incorporated with DTS instrumentation or separate from such instrumentation. DTS data may be processed in real time or stored for subsequent processing. Carrying out the calibration may include outputting temperature data from independent or common units for Brillouin-based DTS data collection, Raman-based DTS data collection and optionally point temperature sensor data collection devices associated with respective instrumentation to a computer processor that is configured to assess the data and perform the calibration as described herein. Human interpretation of the plots as shown in FIG. 3 or running of data analyzing computer applications enable determining a confidence level of any measurements output. For some embodiments, the measurement output as indicated only by Brillouin scattered light for a particular time includes a profile of temperature that is compensated based on prior calibrations and is displayed on a screen, such as shown in FIG. 3 but without requiring display of the raw data curve 316.

While the foregoing is directed to embodiments of the present invention, other and further embodiments of the invention may be devised without departing from the basic scope thereof, and the scope thereof is determined by the claims that follow.

What is claimed is:

1. A system for distributed temperature sensing (DTS), comprising:
   at least one DTS optical fiber; and
   instrumentation coupled to the at least one DTS optical fiber,
   wherein the instrumentation is configured to perform Raman-based DTS signal processing, perform Brillouin-based DTS signal processing, and calibrate data from the Brillouin-based DTS signal processing based on a correction determined by using data from the Raman-based DTS signal processing performed at multiple times in order to provide calibrated temperature measurements that are calibrated per relative change in temperature over time.

2. The system of claim 1, further comprising at least one point temperature sensor adjacent to the at least one DTS optical fiber.

3. The system of claim 1, wherein the instrumentation is further configured to calibrate the data from the Raman-based DTS signal processing with data from at least one point temperature sensor.

4. The system of claim 1, wherein the instrumentation is further configured to adjust the calibrated temperature measurements based on data from at least one point temperature sensor.

5. The system of claim 1, wherein the at least one DTS optical fiber includes a first fiber coupled to part of the instrumentation that performs Raman-based DTS signal processing and a second fiber coupled to part of the instrumentation that performs Brillouin-based DTS signal processing.

6. The system of claim 1, further comprising an optical waveguide disposed beside the at least one DTS optical fiber, wherein the optical waveguide includes at least one Bragg grating based temperature sensor.

7. The system of claim 1, further comprising a first fiber having a point temperature sensor disposed beside the at least one DTS optical fiber that includes a second fiber associated with Raman-based DTS signal processing and a third fiber associated with the Brillouin-based DTS signal processing.

8. The system of claim 1, further comprising an output to display the calibrated temperature measurements.

9. A method of distributed temperature sensing (DTS), comprising:
   (A) measuring a first temperature profile obtained with Raman-based DTS;
   (B) measuring a second temperature profile obtained with Brillouin-based DTS;
   (C) repeating (A) and (B) at a later time to determine a correction for the second temperature profile based on the first temperature profile, the correction being determined by a relative change in temperature over time;
   (D) measuring a third temperature profile obtained with Brillouin-based DTS subsequent to the first and second temperature profiles; and
   (E) adjusting the third temperature profile with the correction.

10. The method of claim 9, further comprising displaying the third temperature profile after being adjusted with the correction.

11. The method of claim 9, further comprising running a DTS optical cable into a well bore such that the profiles obtained correspond to a length of the cable.

12. The method of claim 9, further comprising calibrating the first temperature profile with data from at least one point temperature sensor.

13. The method of claim 9, further comprising calibrating the third temperature profile based on data from at least one point temperature sensor after adjusting the subsequent temperature profiles with the correction.

14. The method of claim 9, further comprising disposing a DTS optical cable from which the profiles are obtained alongside an optical waveguide that includes at least one Bragg grating based temperature sensor.

15. The method of claim 9, further comprising disposing a first fiber from which the first temperature profile is obtained alongside a second fiber from which the second temperature profile is obtained.

16. The method of claim 9, further comprising disposing a first fiber having a point temperature sensor disposed therein alongside second and third fibers from which the first and second temperature profiles are respectively obtained.

17. A system for distributed temperature sensing (DTS), comprising:
   a Raman-based DTS processor;
   a Brillouin-based DTS processor;
   a calibration processor that determines a correction for the Brillouin-based DTS processor, wherein the calibration processor has inputs coupled to the Raman-based DTS processor and the Brillouin-based DTS processor to receive respective Brillouin-based and Raman-based data and compare them at multiple times in order to provide the correction calibrated per relative change in temperature over time; and
   an adjusted output of temperature measurements derived from applying the correction to the data from the Brillouin-based DTS processor.

18. The system of claim 17, further comprising an optical cable coupled to the DTS processors.

* * * * *